Nov. 20, 1934.  B. L. BOBROFF  1,981,302
SIGNAL LIGHT FOR AUTOMOTIVE VEHICLES
Filed Aug. 22, 1930  3 Sheets-Sheet 1
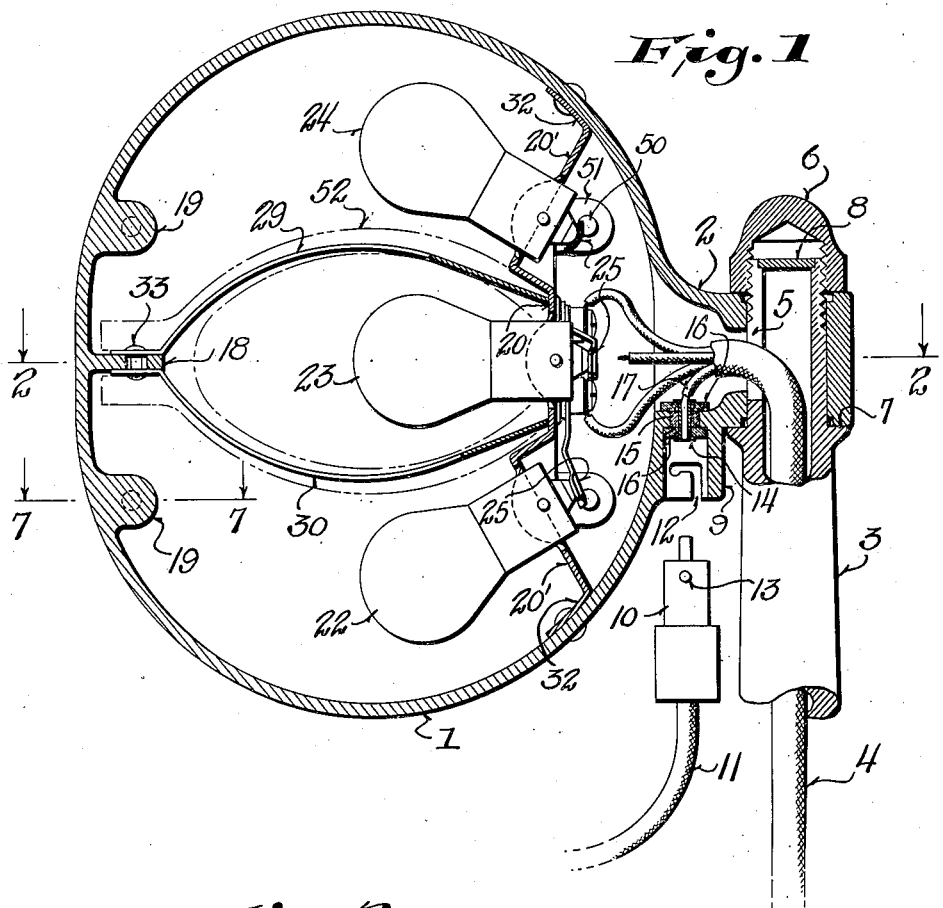
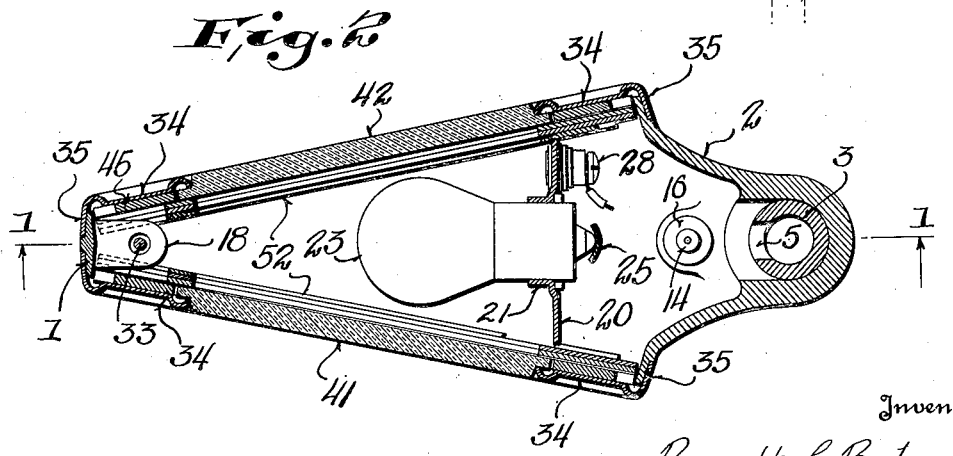
Inventor
Bornett L. Bobroff
By Arthur R. Woodfolk
Attorney Nov. 20, 1934.  B. L. BOBROFF  1,981,302
SIGNAL LIGHT FOR AUTOMOTIVE VEHICLES
Filed Aug. 22, 1930   3 Sheets-Sheet 2
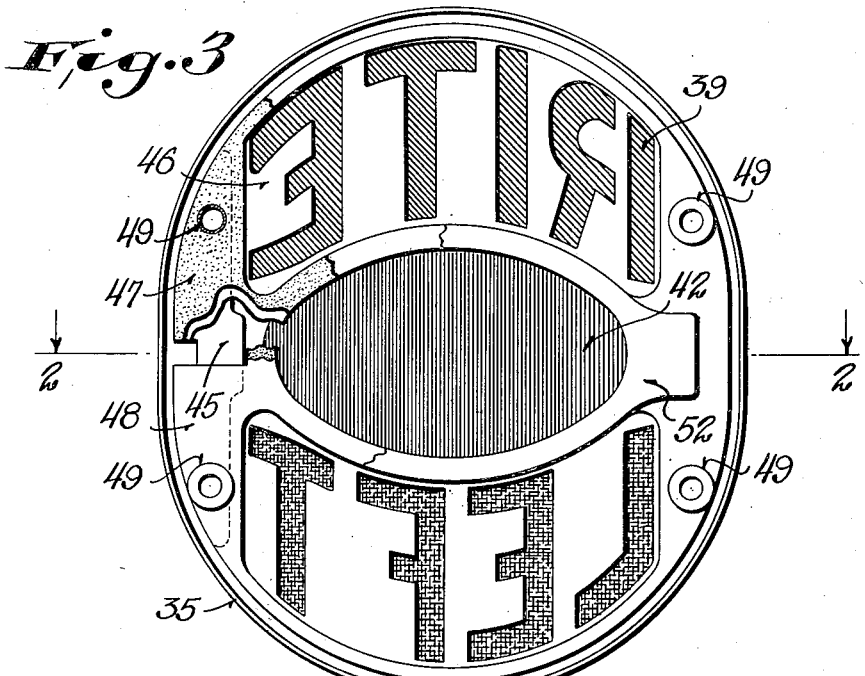
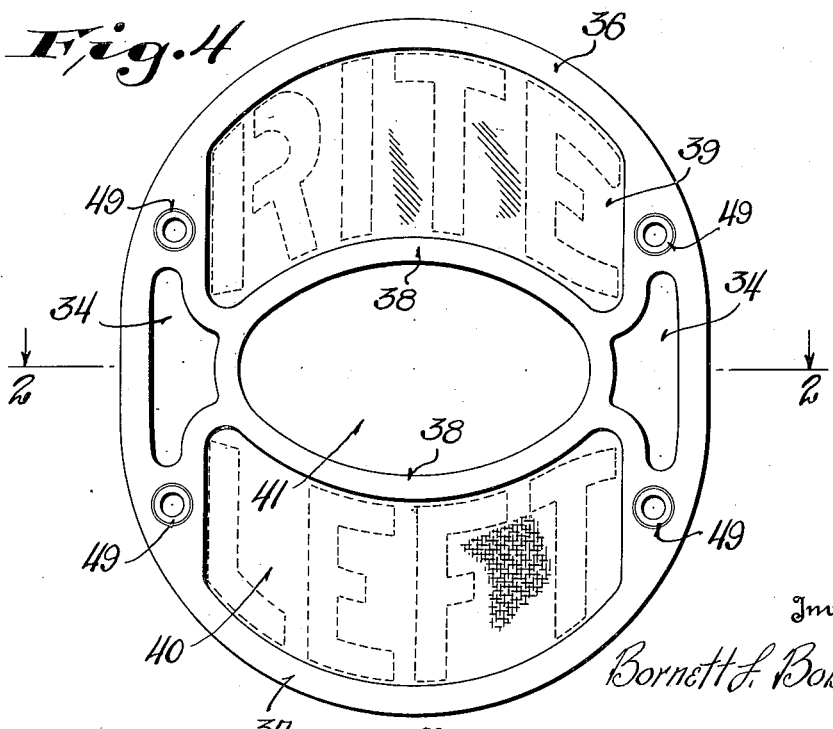
Inventor
Bornett L. Bobroff
By Arthur R. Woolfolk
Attorney Nov. 20, 1934. B. L. BOBROFF 1,981,302
SIGNAL LIGHT FOR AUTOMOTIVE VEHICLES
Filed Aug. 22, 1930 3 Sheets-Sheet 3
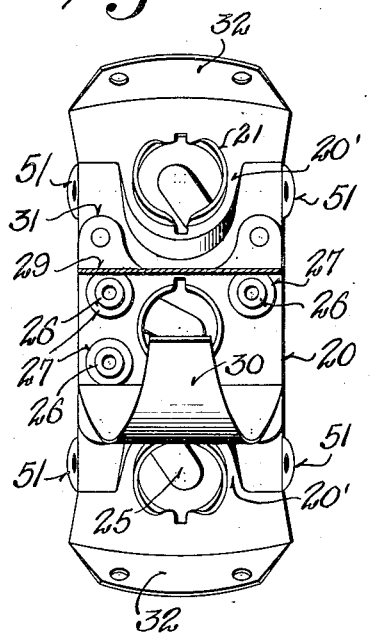
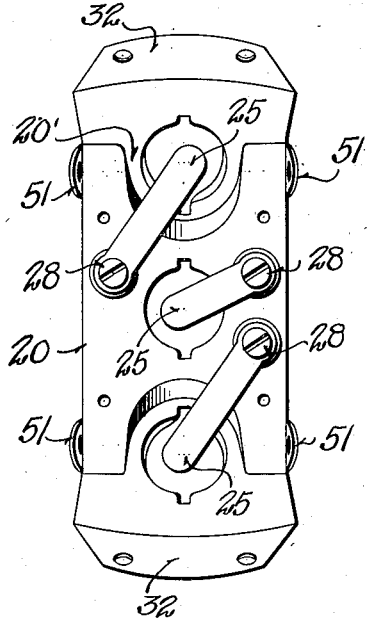
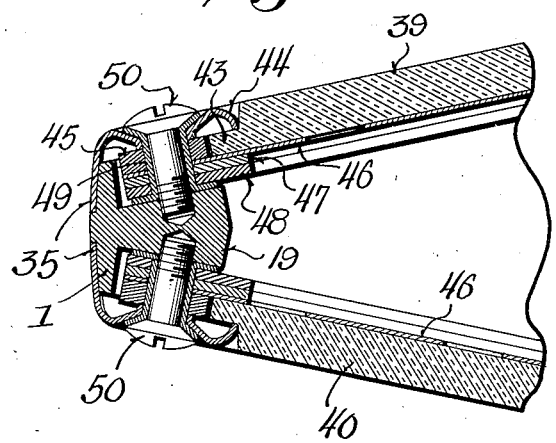
Inventor
Bornett L. Bobroff
By Arthur R. Woolfolk
Attorney Patented Nov. 20, 1934

1,981,302

UNITED STATES PATENT OFFICE 1,981,302

SIGNAL LIGHT FOR AUTOMOTIVE VEHICLES

Bernett L. Bobroff, Racine, Wis.

Application August 22, 1930, Serial No. 477,072

3 Claims. (Cl. 177—329)

This invention relates to automotive vehicle lights, and is particularly directed to a combined cowl or side light and a signal light.

Objects of this invention are to provide a combined side light, stop light, signal light and parking light, which may be attached to an automotive vehicle preferably in such a position as to function as cowl or side light, which is adapted to give any one of a plurality of signals such as "Rite" and "Left" which may have green and amber color and displayed towards the side, front and rear of the automotive vehicle, a red stop or parking light displayed towards the rear side and rearwardly, and a white or similar uncolored light displayed towards the front side and forwardly of the automotive vehicle.

Further objects are to provide a vehicle signal light which is adapted to give any one of a plurality of differently colored signals and also to display insignia, so that either or both the colors or the insignia may be understood by a following or approaching driver and are visible from both front and rear and from the side of the automotive vehicle.

It has been found that the signal lights for automotive vehicles are subjected to excessive vibration and there is a tendency for the parts to loosen and rattle, and for the glass panels to chip or break. This invention, however, overcomes these defects, and further objects of this invention are to provide a novel form of signal light and parking light construction which is so made that the parts cannot loosen and rattle even after extended use, and in which the glass panels are protected against loosening, chipping, or cracking.

Further objects are to provide an automotive vehicle light in which a plurality of glass, or other transparent segments or panels are held together as a unitary construction with a removable rim, so that the rim and panels may be removed as a unit to afford access to the interior of the casing for renewal of the lamps.

Further objects are to provide a novel construction of combined side light and signal light in which a plurality of spring contact fingers or strips are securely and permanently clamped in place and are insulated from the metal body portion and are adapted to receive conductors, such spring fingers serving as the live contact member for the several lamps.

Further objects are to provide a signal light for an automotive vehicle in which a casing is divided into a plurality of compartments by means of a rigidly formed unitary structure forming a lamp socket strip and division partitions, and in which the unitary structure is firmly and permanently anchored or attached at a plurality of spaced points whereby the unitary structure is also unitary with the casing and forms with the casing a rigid unit free from any chance of loosening or rattling.

Further objects are to provide a novel form of signal light in which the unitary structure forming the lamp socket strip and division partitions and carrying the spring contact fingers may be wired up or, in other words, may have the lead in conductors or wires attached thereto prior to assembling within the casing, to thereby afford the utmost freedom for this operation, whereby such structure, with the wires attached, may be most easily assembled with the casing and permanently and rigidly attached thereto.

Further objects are to provide a signal light for an automotive vehicle in which hollow rivets clamp the contact fingers for the lamps in place and are internally threaded to receive the attaching screws for the conductors thereby dispensing with at least one additional fastening means, and in which an insulating base is provided for a trouble lamp plug and held in assembled position by means of a hollow rivet, the lead in wire passing into the hollow rivet and being soldered thereto and the hollow rivet itself serving as the center contact for the prong of the trouble lamp plug.

Further objects are to provide a signal light for an automotive vehicle in which the major portions are permanently joined by rivets, welding or other means so that they cannot shake apart in use even if subjected to excessive vibration, which will not rattle and which still permits the ready renewal of the lamps.

An embodiment of the invention is shown in the accompanying drawings, in which:—

Figure 1 is a vertical sectional view through the combined cowl or side light and signal light, the panels being removed, such view corresponding to a section on the line 1—1 of Figure 2.

Figure 2 is a transverse sectional view taken on the line 2—2 of Figures 1 and 3.

Figure 3 is an inside view of the rear panel, such view being partly broken away.

Figure 4 is a front or face view of the front panel.

Figure 5 is a view, partly in section, of the lamp socket strip and division portions.

Figure 6 is a view of the structure shown in Figure 5 but taken from the opposite side from that shown in Figure 5.

Figure 7 is an enlarged, fragmentary sectional view on the line 7—7 of Figure 1.

Referring to the drawings, it will be seen that the combined cowl or side light and signal light comprises a casing frame 1 which may be attached to the automotive vehicle in any suitable manner. A preferred manner of attaching or supporting the light is shown in the drawings, particularly Figures 1 and 2, in which the casing is provided with a rearwardly extending hollow portion 2, which is apertured and which slips over, or is carried by a side bracket 3. The side bracket 3 is hollow and carries the cable 4 of the lead in wires, such wires passing through a slot 5 in the bracket and into the hollow extension of the casing 1. The upper end of the bracket arm 3 is threaded and receives the clamping nut 6 which clamps the extension 2 of the casing against a shoulder 7 formed on the bracket. Preferably a disk 8 is seated within the upper end of the bracket 3 to prevent collapse of such slotted upper end when the nut is screwed tightly into place.

The hollow projecting portion 2 of the casing is provided with a downwardly opening socket 9 which is adapted to receive the plug 10 of a trouble lamp cable 11, such socket being provided with a bayonet slot 12 to receive the pin 13 of the trouble lamp plug to thereby temporarily lock such plug in place. The center contact of the plug is adapted to engage a hollow metallic rivet 14 which holds the insulating bushing 15 and the upper and lower insulating washers 16 in place. This hollow rivet not only has the double function noted above, but also receives the end of the supply wire 17 which is slipped into such rivet and is thereafter soldered in place. The metallic body portion of the plug may contact with the metal socket 9 and thus form the other contact for the trouble lamp circuit.

The casing frame 1 is roughly oval in vertical contour and also is tapered towards its outer edge as may be seen from Figures 1 and 2 so that the front and rear panels, hereinafter described, form a dihedral angle. The casing is provided with an inwardly projecting flat lug 18 substantially centrally of its outer portion, and with upper and lower lugs 19, see Figures 1 and 2.

A metal lamp base strip 20 is provided with three apertures surrounded by flanges 21 which form integral lamp sockets for the reception of the bases of the lamps 22, 23 and 24.

The lamps' base strip 20 is provided with outwardly pressed upper and lower portions 20' so that the upper and lower lamp 24 and 22 are set at angles to the center lamp 23. As may be seen from Figures 1, 5 and 6. The metallic bases of the lamps thus form one portion of the lamp circuits by contacting with the metallic strip 20.

The center contact of each lamp engages a corresponding spring finger or contact strip, such contact strips being indicated by the reference character 25. Each contact strip is rigidly clamped to the base strip 20 by means of hollow metallic rivets 26 which pass through insulating bushings 27, see Figures 1, 2, 5 and 6. These hollow rivets 26 are internally threaded and receive the attaching screws 28 which secure the appropriate wires of the cable 4 in place and serve to electrically connect such wires to the appropriate spring fingers 25, see Figures 1, 2 and 6. The hollow rivets 26 thus perform the dual function of clamping the spring fingers in place and of receiving the terminal screws 28.

An upper and a lower metallic partition or division member, indicated respectively by the reference characters 29 and 30 in Figures 1 and 5, are provided with ears 31 which are welded or riveted to the base strip 20 and form with such base strip a unitary structure. The base strip 20 is provided with feet 32 which are riveted or welded to the casing 1. The base strip 20 is spaced from the rear wall of the casing and thus provides a compartment in the rear portion of the casing 1 and extension 2 for the reception of the wires from the cable 4.

The partitions 29 and 30 are bowed apart to provide a compartment for the lamp 23 and their outer ends are secured by a rivet 33 or by welding to the central, inwardly extending lug 18 carried by the outer side wall of the casing, as may be seen from Figure 1.

In assembling the device, it is preferable to connect the wires by means of the screws 28 and thereafter slip the unit composed of the base strip 20 and the partitions 29 and 30 into place within the casing, the cable 4 being passed outwardly through the extension 2 of the casing. It is also preferable, though not wholly necessary to use lock washers for the screws 28, such lock washers being omitted from the drawings for the sake of clearness. Subsequently, the ears 32 and the outer ends of the partitions 29 and 30 are rigidly and permanently secured in place by riveting or welding as previously described.

The front and rear of the casing is provided with panels, either or both of which may be removable. In the form shown, both panels are removable. The rear panel is shown in Figure 3, which is an inner face view partly broken away, and the front panel is shown in Figure 4, which is an outer face view. Except for the color of the central glass segments the panels may be identical, and accordingly, as far as possible, the same reference characters will be used for similar parts.

The panels are each composed of an outer pressed metal frame 34 which is provided with an inwardly extending marginal flange 35 which fits over the casing as may be seen from Figure 2 and engages a shoulder formed on the casing. The outer frame 34 is provided with upper and lower portions 36 and 37 and division strips 38 which divide the panel into three segments, such strips or bars 38 being opposite the partitions 29 and 30 and providing an oval central opening, upper and lower arcuate openings being defined by the portions 36 and 38 and 38 and 37.

A green glass or other transparent panel or segment 39 is provided for the upper opening, and an amber glass or other transparent panel or segment 40 is provided for the lower opening, a similar construction being followed for both the front and rear panels. The front panel is provided with a white or frosted colorless central glass segment 41 and the rear panel is provided with a red central glass segment 42.

It is preferable to provide each of the glass segments with inwardly set flanges 43, see Figure 7, which engage slightly beaded inturned portions 44 of the outer metal frames 34. If desired spacing strips 45 may be provided in line with the flanges 43.

An inner stencil plate 46 is provided for both front and rear panels having an oval central cut out and having "Rite" and "Left" cut in their upper and lower portions, as shown. A cork gasket 47 and a metal backing plate 48 are successively located rearwardly of the glass segments, as most clearly shown in Figure 7. A plurality of hollow rivets 49 extend through the metal outer frame, the spacing strips 45, the stencil plate 46, the cork gasket 47 and the rear backing plate 48, and may, therefore, be riveted in place without danger to the glass.

Each panel is, therefore, formed as a unitary structure and may be removed and replaced as a unit, the glass segments being firmly and permanently clamped in place and protected against chipping or breaking. Attaching screws 50 extend through the hollow rivets 49 and are threaded into the lugs 19 of the casing, see Figure 7, and into lugs 51 formed integrally with the backing strip 20, see Figure 1. If desired, lock washers, (not shown) may cooperate with the screws 50.

If desired a small oval shaped cork gasket 52 having an open center may be glued to the backing plate 48, see the dot and dash indication in Figure 1. This cork gasket provides a cushion for the partitions 29 and 30.

If desired, the spring fingers for engaging the center contacts of the lamps may be slightly cupped, as shown, so that they will insure a more secure engagement with the central contacts.

It will be seen that a novel form of combination side or cowl light and signal light has been provided, which will display the signals "Rite" and "Left", both from the front and rear and to the side of the vehicle due to the angularly arranged front and rear panels. It will also be seen that the device will display such signals in green and amber colors. Further the device is so made that it will display a red signal rearwardly and to the side and a white signal forwardly and to the side whenever the central lamp is illuminated. This central lamp may be used as a stop light if so desired.

It is also to be noted that the device is so made that the central lamp may be used for the usual cowl or side lights and may be used for parking. Under these conditions a white light will be displayed forwardly and to the side and a red light will be displayed rearwardly and to the side.

Particular attention is called to the fact that due to the wedge shape of the device, having outwardly converging front and rear walls, that the signals are not only visible directly forwardly and rearwardly but are also visible from the side of the automotive vehicle so that an approaching or following driver or pedestrian, even if located to the side of the vehicle is always apprised of the intensions of the driver.

It is to be noted that the device is so made that it may be most easily applied to an automotive vehicle.

Further, due to the integral construction of front and rear panels, either panel may be removed as a unit without danger of displacing the glass segments.

The device is so constructed that although it may be subjected to excessive vibration, that nevertheless rattling or loosening will not result as the major portion of the device has its parts rigidly and permanently joined.

It is also to be noted that the vehicle light is composed of a small number of parts, is cheap to make and is easy to assemble.

The expression, "transparent" is intended to include both transparent and translucent or other light transmitting condition or characteristic.

Although the invention has been described in considerable detail, such description is intended as illustrative rather than limiting as the invention may be variously embodied and is to be interpreted as claimed.

I claim:—

1. A signal light for an automotive vehicle comprising a substantially oval-shaped casing frame having an inner side, an upper and a bottom side and an outer side, front and rear open faces, a base strip extending transversely between the faces and permanently secured at its ends to the upper and bottom sides of said casing interiorly thereof near the inner side and having a vertical central portion and upper and lower angular portions directed towards the inner side of the casing frame and diverging from the central portion of the strip, each of the portions of the base strip having lamp sockets, partitions permanently secured at their inner ends to the central portion of the base strip above and below the lamp socket respectively and secured at their outer ends to the casing, the upper partition being upwardly bowed and the lower partition being downwardly bowed to form with the casing upper and lower semi-annular shaped compartments and a substantially oval shaped central compartment, lamps carried within said lamp sockets and extending into the respective compartments, and front and rear panels having transparent upper and lower portions, at least one of said panels having a transparent central portion.

2. A signal light for an automotive vehicle comprising a substantially oval-shaped casing frame having an inner side, an upper and a bottom side and an outer side, front and rear open faces, a base strip extending transversely between the faces and permanently secured at its ends to the upper and bottom sides of said casing interiorly thereof near the inner side and having a vertical central portion and upper and lower angular portions directed towards the inner side of the casing frame and diverging from the central portion of the strip, each of the portions of the base strip having lamp sockets, partitions permanently secured at their inner ends to the central portion of the base strip above and below the lamp socket respectively and secured at their outer ends to the casing, the upper partition being upwardly bowed and the lower partition being downwardly bowed to form with the casing upper and lower semi-annular shaped compartments and a substantially oval shaped central compartment, lamps carried within said lamp sockets and extending into the respective compartments, and front and rear panels having transparent upper and lower portions, at least one of said panels having a transparent central portion, the inner side of said casing frame having a hollow projecting portion, said hollow projecting portion being provided with an opening to the interior of the casing and a second opening at right angles to the first mentioned opening for the reception of a supporting standard, said openings communicating with each other through the hollow interior of said projecting portion, and connections for the lamps threaded through the communicating openings of the hollow projecting portion into the casing adjacent the base of the lamps supported by the base strip.

3. A signal light for an automotive vehicle comprising a substantially oval-shaped casing frame having an inner side, an upper and a bottom side and an outer side, front and rear open faces, a base strip extending transversely between the faces and permanently secured at its ends to the upper and bottom sides of said casing interiorly thereof near the inner side and having a vertical central portion and upper and lower angular portions directed towards the inner side of the casing frame and diverging from the central portion of the strip, each of the portions of the base strip having lamp sockets, partitions permanently secured at their inner ends to the central portion of the base strip above and below the lamp socket respectively and secured at their outer ends to the casing, the upper partition being upwardly bowed and the lower partition being downwardly bowed to form with the casing upper and lower semi-annular shaped compartments and a substantially oval shaped central compartment, lamps carried within said lamp sockets and extending into the respective compartments, and front and rear panels having transparent upper and lower portions, at least one of said panels having a transparent central portion, the inner side of said casing frame having a hollow projecting portion, said hollow projecting portion being provided with an opening to the interior of the casing and a second opening at right angles to the first mentioned opening for the reception of a supporting standard, said openings communicating with each other through the hollow interior of said projecting portion, and connections for the lamps threaded through the communicating openings of the hollow projecting portion into the casing adjacent the base of the lamps supported by the base strip, said hollow projecting portion having a downwardly opening trouble light socket formed in its underside at its junction with the inner casing wall, and a conductor leading to said trouble lamp socket and passing through said hollow projecting portion.

BORNETT L. BOBROFF.